United States Patent [19]

Lipscombe

[11] Patent Number: 5,062,259
[45] Date of Patent: Nov. 5, 1991

[54] ROTARY DRIVE MECHANISMS

[75] Inventor: Brian R. Lipscombe, Bishops Cleeve, England

[73] Assignee: Ultra Hydraulics Limited, Cheltenham, England

[21] Appl. No.: 526,552

[22] Filed: May 21, 1990

[30] Foreign Application Priority Data

Apr. 4, 1990 [GB] United Kingdom ............... 9007676

[51] Int. Cl.⁵ ............................................ A01D 55/18
[52] U.S. Cl. ........................................ 56/255; 56/295
[58] Field of Search ............... 56/12.3, 16.8, 17.5, 56/255, 295; 384/275, 276

[56] References Cited

U.S. PATENT DOCUMENTS

| | | | |
|---|---|---|---|
| 2,539,619 | 1/1951 | Goodall | 56/12.3 X |
| 4,176,508 | 12/1979 | Baumann et al. | 56/17.5 X |
| 4,181,480 | 1/1980 | Balsiger | . |
| 4,251,182 | 2/1981 | Schroeder | 384/276 X |
| 4,478,029 | 10/1984 | Moore et al. | 56/255 X |
| 4,878,767 | 11/1989 | Halder | 384/275 X |

FOREIGN PATENT DOCUMENTS 0277057 8/1988 France .
1483011 8/1977 United Kingdom .

*Primary Examiner*—William P. Neuder
*Attorney, Agent, or Firm*—Young & Thompson

[57] ABSTRACT

A rotary drive mechanism comprises an hydraulic motor, a shaft rotatable by the hydraulic motor, a cutting blade (or fan impeller) connected to the shaft, and a bearing assembly supporting the shaft. The bearing assembly comprises a bearing housing, a plain journal bearing mounted in the housing, and a plain thrust bearing integral with the journal bearing also mounted in the housing.

11 Claims, 2 Drawing Sheets

ROTARY DRIVE MECHANISMS

INTRODUCTION

This invention relates to a rotary drive mechanism, for a cutter or fan, and more particularly but not exclusively to a rotary drive mechanism for a cutting blade of a rotary mower.

Rotary mowers have to be designed so that the cutting blade and its mounting will withstand sudden impacts against rocks, stones, lumps of concrete or like items on or embedded in the ground. Indeed industrial rotary mowers are subject to rigorous safety requirements. For example, in the U.S.A. the SAE (Society of Automobile Engineers) recommends a number of tests including a sudden impact test in which a 1 inch (25 mm) diameter steel rod, firmly supported in a tube, is injected from below into the path of the rotating blade of the mower close to the tip of the blade. A similar impact test is laid down by draft European regulations. This impact test is intended to simulate the blade striking a rock or stone.

The shaft of the blade of conventional industrial mowers is supported in one or more ball or roller bearings. These conventional mowers suffer from drawback that when the blade meets with a sudden impact, the bearings are subject to brinelling which is the permanent deformation of the surface of the bearing races caused by high local stresses between a ball or roller and the races. This leads to progressive failure of the bearing.

SUMMARY OF THE INVENTION

In seeking to mitigate this drawback, the present invention provides a rotary drive mechanism comprising an hydraulic motor, a shaft rotatable by the hydraulic motor, a cutting blade or fan impeller connected to the shaft, and a bearing assembly supporting the shaft, the bearing assembly comprising a bearing housing, a plain journal bearing mounted in said housing, and a thrust bearing also mounted in said housing.

When the blade or impeller of a rotary drive mechanism according to the invention meets with a sudden impact the stresses between the shaft and the plain journal bearing are spread over a large area with the result that the bearing is far less susceptible to failure than when using ball or roller bearings. Also, by using a plain journal bearing in combination with an hydraulic motor, it is possible to lubricate the journal bearing, and indeed also the thrust bearing, with hydraulic fluid from the hydraulic motor.

Preferably, the thrust bearing is integral with the plain journal bearing.

Advantageously, the bearing assembly comprises two plain journal bearings, each having an integral thrust bearing, the plain journal bearings being spaced from one another in a direction parallel to the axis of the shaft and the two thrust bearings being at respective adjacent ends of the two journal bearings. In this case the shaft may have a radial, outwardly extending flange between the two thrust bearings.

Preferably, the bearings each have a porous sintered impregnated bearing surface.

Conveniently, the bearing housing includes a mounting flange and means securing the hydraulic motor to the mounting flange. Alternatively, the bearing housing may be integral with a part of the hydraulic motor.

The invention will now be more particularly described, by way of example, with reference to the accompanying drawings.

DESCRIPTION OF THE PREFERRED EMBODIMENTS

Figure 1:
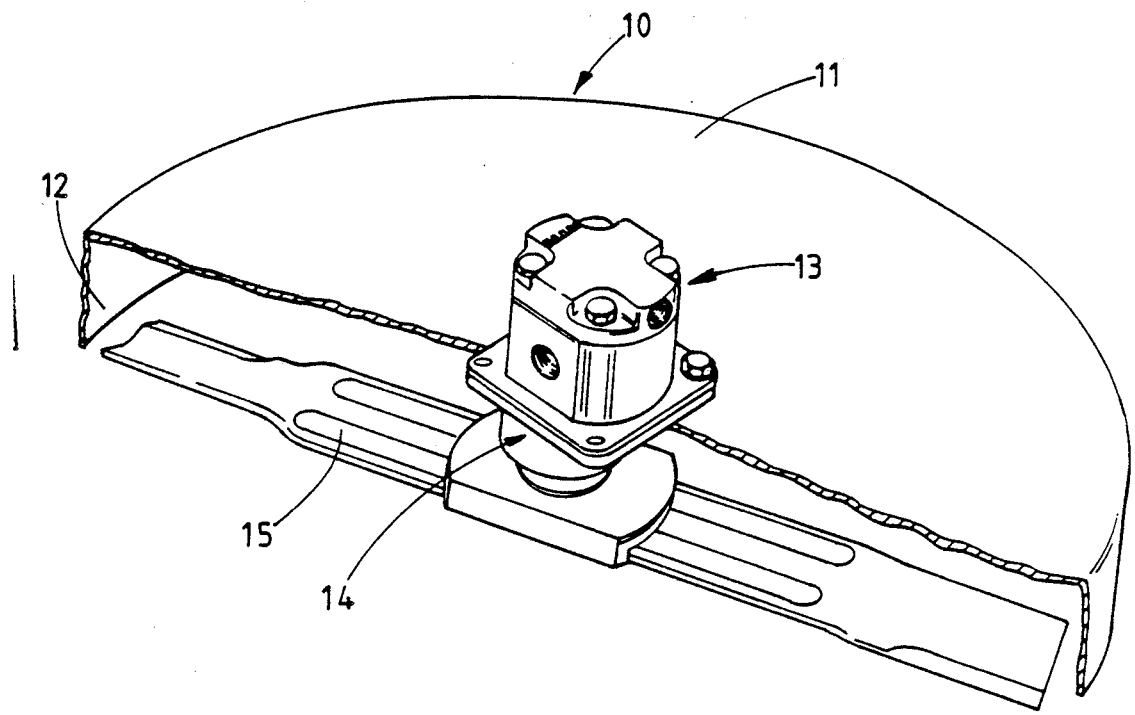
FIG. 1 is a perspective view of part of an industrial rotary mower equipped with one embodiment of a rotary drive mechanism according to the present invention, with part of the housing broken away.

Referring to FIG. 1, the rotary mower comprises a housing in the form of a cowl 10 having circular upper side 11 and a depending cylindrical skirt 12, an hydraulic motor 13 in the form of a gear motor, a bearing assembly 14, secured to the motor 13, and a blade 15 rotatable by the motor 13.

Figure 2:
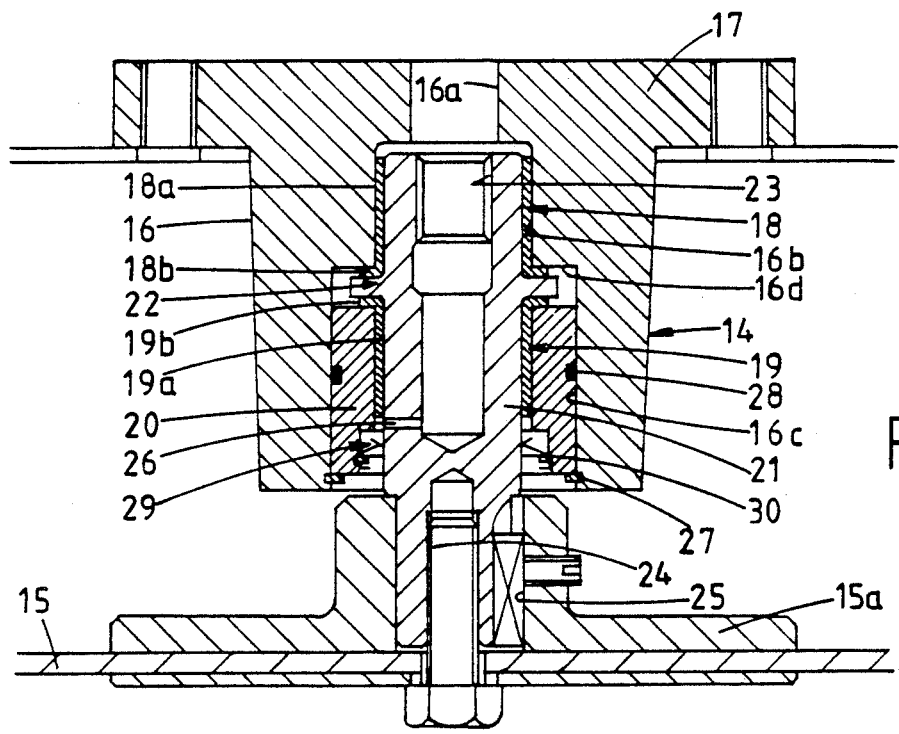
FIG. 2 is a sectional view through part of the drive mechanism of FIG. 1.

Referring to FIG. 2, the bearing assembly 14 shown therein comprises a bearing housing 16 provided with an integral mounting flange 17, an upper bearing 18 supported by the housing 16, and lower bearing 19 supported by a carrier 20 mounted in the housing 16.

Each bearing 18, 19 is in the form of a split sleeve having a cylindrical portion 18a, 19a, which defines a plain journal bearing, and a radial, outwardly extending portion 18b, 19b, which is integral with an end of a respective cylindrical portion 18a, 19a, and which defines a thrust bearing, the radial portions 18b, 19b being at adjacent ends of the bearings 18 and 19.

A shaft 21 is supported for rotation in the cylindrical portions 18a, 19a of the bearings 18 and 19 and has an integral outwardly extending flange 22 which is disposed between and which co-operates with the two radial portions 18b, 19b of the bearings 18 and 19. The shaft 21 has a splined blind bore 23 at its upper end for receiving a splined end of an output shaft of the hydraulic motor 13 (see FIG. 1) and a tapped blind bore 24 and a key way 25 at its lower end for securing a rotary cutting blade holder 15a thereto. A radial passage 26 is provided in the shaft 21 to communicate the lower end of the blind bore 23 to a position immediately below the lower end of the lower bearing 19 for a purpose which will become apparent hereinafter.

The bearing housing 16 is of stepped internal diameter so as to define an opening 16a at its upper end through which the output shaft of the motor 13 enters the housing, a bearing support portion 16b and a carrier receiving portion 16c. The portion 16c is of greater diameter than the portion 16b and an annular ledge 16d is defined between the two portions 16b and 16c. The cylindrical portion 18a of the bearing 18 is supported by the bearing support portion 16b of the housing 16 and the radial portion 18b is supported by the ledge 16d. The portions 19a and 19b of the bearing 19 are supported by the carrier 20 which is itself mounted in the carrier receiving portion 16c of the housing 16 and held in place by a circlip 27. An 'O' ring seal 28 is provided in an annular groove in the outer peripheral wall of the carrier 20 to co-operate with the carrier receiving portion 16c of the housing 16 and a packing seal 29 is provided between the shaft 21 and the carrier 20 and is held in place by a washer 27 and another circlip 30.

The bearings 18 and 19 are of steel and are provided with a porous sintered bearing surface, which is typically of sintered bronze, impregnated with, for example, PTFE and lead.

The mounting flange 17 of the housing 16 is bolted to the cowl 10 and to a mounting flange of the motor 13 with the output shaft of the motor received in and connected to the shaft 21 by virtue of interengaging splines.

Also, an area of the motor 13 which is connected to drain, communicates with the opening 16a in the housing so that, when the mower is in use, hydraulic fluid enters the blind bore 23 in the shaft 21 via the opening 16a. This hydraulic fluid is forced outwardly through the passage 26 during rotation of the shaft 21 and passes between the shaft 21 and the sintered bearing surfaces of the bearings 18 and 19 to lubricate these surfaces.

Figure 3:
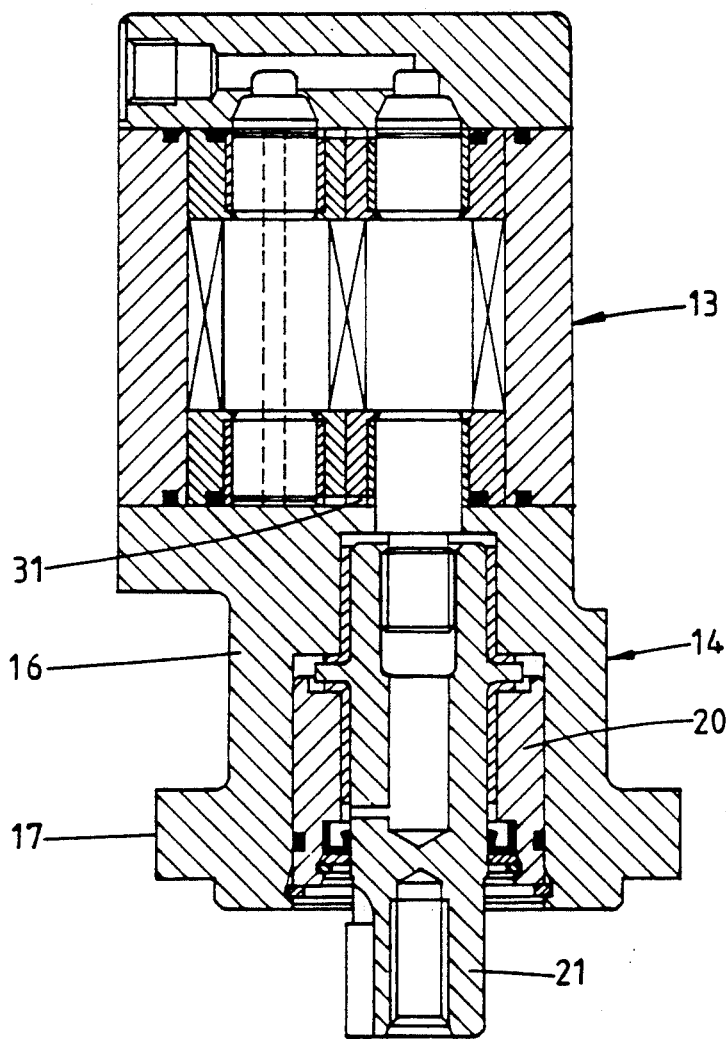
FIG. 3 is a sectional view through an alternative drive mechanism.

The drive mechanism shown in FIG. 3 differs from that shown in FIGS. 1 and 2 in that the housing 16 is formed integrally with an end cover of the motor 13 and the mounting flange 17 is provided near the lower end of the housing 16 and is disposed within the cowl 10 (not shown). FIG. 3 also shows the communication between an area of the motor connected to drain (indicated by the reference numeral 31) and the opening 16a.

The above embodiments are given by way of example only and various modifications will be apparent to persons skilled in the art without departing from the scope of the invention defined by the appended claims. For example the thrust bearings could be separate from the journal bearings. Indeed, there could be only a single journal bearing. The motor need not be a gear motor. It could instead be any other appropriate hydraulic motor. Also, the drive mechanism could be used to drive the cutting mechanism of a cylinder mower, or indeed another form of cutter or an impeller of a fan.

What is claimed is:

1. A rotary drive mechanism comprising an hydraulic motor, a shaft rotatable by the hydraulic motor, a blade connected to the shaft, and a bearing assembly supporting the shaft, the bearing assembly comprising a bearing housing, a plain journal bearing mounted in said housing, a thrust bearing also mounted in said housing, and means for lubricating the journal and thrust bearings with hydraulic fluid from the hydraulic motor.

2. A rotary drive mechanism as claimed in claim 1, wherein the thrust bearing is integral with the plain journal bearing.

3. A rotary drive mechanism as claimed in claim 2, wherein the bearing assembly comprises two plain journal bearings, each having an integral thrust bearing, the plain journal bearings being spaced from one another in a direction parallel to the axis of the shaft and the two thrust bearings being at respective adjacent ends of the two journal bearings.

4. A rotary drive mechanism as claimed in claim 3, wherein the shaft has a radial, outwardly extending flange disposed between the two thrust bearings.

5. A rotary drive mechanism as claimed in claim 1, wherein the bearings each include a porous sintered impregnated bearing surface.

6. A rotary drive mechanism as claimed in claim 1, wherein the bearing housing includes a mounting flange and means securing the hydraulic motor to the mounting flange.

7. A rotary drive mechanism as claimed in claim 1, wherein the bearing housing is integral with a part of the hydraulic motor.

8. A rotary drive mechanism as claimed in claim I, wherein the hydraulic motor is a gear motor.

9. A rotary drive mechanism as claimed in claim 1, wherein said thrust bearing is a plain thrust bearing.

10. A rotary mower having a drive mechanism comprising an hydraulic motor, a shaft rotatable by the hydraulic motor, a cutting blade connected to the shaft, and a bearing assembly supporting the shaft, the bearing assembly comprising a bearing housing, a plain journal bearing mounted in said housing, a thrust bearing also mounted in said housing, and means for lubricating the journal and thrust bearings with hydraulic fluid from the hydraulic motor.

11. A rotary mower as claimed in claim 10, wherein said thrust bearing is a plain thrust bearing.

* * * * *